US012794201B2

(12) United States Patent
Orikawa et al.

(10) Patent No.: US 12,794,201 B2
(45) Date of Patent: Nov. 10, 2026

(54) WIRE GRIPPER

(71) Applicant: NAGAKI SEIKI CO., LTD., Daito (JP)

(72) Inventors: Tomohiro Orikawa, Osaka (JP); Shinya Iwata, Osaka (JP)

(73) Assignee: NAGAKI SEIKI CO., LTD., Daito (JP)

( * ) Notice: Subject to any disclaimer, the term of this patent is extended or adjusted under 35 U.S.C. 154(b) by 567 days.

(21) Appl. No.: 18/275,590

(22) PCT Filed: Jan. 21, 2022

(86) PCT No.: PCT/JP2022/002300
§ 371 (c)(1),
(2) Date: Aug. 2, 2023

(87) PCT Pub. No.: WO2022/168647
PCT Pub. Date: Aug. 11, 2022

(65) Prior Publication Data
US 2024/0106209 A1 Mar. 28, 2024

(30) Foreign Application Priority Data
Feb. 3, 2021 (JP) ................................ 2021-015528

(51) Int. Cl.
*H02G 1/04* (2006.01)

(52) U.S. Cl.
CPC .................................... *H02G 1/04* (2013.01)

(58) Field of Classification Search
CPC ........ H02G 1/04; H02G 1/06; Y10T 24/3936; Y10T 24/394; Y10T 24/3944; Y10T 24/3947; Y10T 24/3949; Y10T 24/3953; Y10T 24/3956; B25B 25/00; B25B 7/12
See application file for complete search history.

(56) References Cited

U.S. PATENT DOCUMENTS 977,236 A * 11/1910 Svensson ............... F16G 3/006 188/67
1,464,939 A * 8/1923 Kearney ................ F16G 3/006 24/134 N
2012/0132874 A1 5/2012 Iwama

FOREIGN PATENT DOCUMENTS

JP 2000-134742 A 5/2000
JP 2015-042036 A 3/2015
TW 2015041774 A 11/2015
(Continued)

OTHER PUBLICATIONS

International Search Report for PCT/JP2022/002300 dated Apr. 5, 2022 [PCT/ISA/210].
(Continued)

*Primary Examiner* — Tyrone V Hall, Jr.
(74) *Attorney, Agent, or Firm* — Sughrue Mion, PLLC

(57) ABSTRACT

[Problem] To provide a wire gripper of excellent operability. [Solution] According to one aspect of the present invention, a wire gripper is provided. This wire gripper comprises: a wire gripping part; a first operation part; and a second operation part. The wire gripping part is configured to be able to hold a linear body by being closed. When the first operation part is pressed, the state transitions to a state where the first operation part and the second operation part are engageable with each other. In the engageable state, the wire gripping part is opened.

15 Claims, 16 Drawing Sheets

(56) References Cited

FOREIGN PATENT DOCUMENTS

| | | | |
|---|---|---|---|
| WO | 2013/175768 | A1 | 11/2013 |
| WO | 2014/050171 | A1 | 4/2014 |
| WO | 2019/087825 | A1 | 5/2019 |
| WO | 2020/262604 | A1 | 12/2020 |

OTHER PUBLICATIONS

Taiwanese Office Action for 111102674 dated Nov. 17, 2022.
Taiwanese Office Action for 111102674 dated Nov. 15, 2011.
Communication dated Oct. 16, 2025 in Indonesian Application No. P00202307136.
Communication dated Jun. 17, 2026, issued in Chinese Application No. 202280012060.8.

* cited by examiner

WIRE GRIPPER

CROSS REFERENCE TO RELATED APPLICATIONS

This application is a National Stage of International Application No. PCT/JP2022/002300 filed Jan. 21, 2022, claiming priority based on Japanese Patent Application No. 2021-015528 filed Feb. 3, 2021, the contents of each of which being herein incorporated by reference in their entireties.

BACKGROUND

The present invention relates to a wire gripper.

RELATED ART

When performing wire tensioning work in electrical construction, railway maintenance, or fruit orchard arbor, it is common to use a wire gripper that grips linear object such as wire and electric cable. Patent document 1 discloses a wire gripper that grips wire by rotating a bolt.

PRIOR ART DOCUMENTS

Patent Document

[Patent Document 1] JP 2015-042036 A

SUMMARY

Problems to be Solved by Invention

Since wire tensioning work is often performed at a high place and involves a risk of electric shock, a wire gripper with satisfactory operability that can be operated quickly and safely is required when performing live wire work. In particular, when performing work by an indirect live wire construction method using an insulating rod with a working tool attached, it is desirable to handle an equipment with easier operation.

In view of the above circumstances, the present invention provides a wire gripper with satisfactory operability.

Means for Solving Problems

According to an aspect of the present invention, a wire gripper is provided. The wire gripper comprises a wire gripping portion, a first actuating portion, and a second actuating portion. The wire gripping portion is configured to grip a linear object by being closed. When the first actuating portion is pushed, the first and second actuating portions transition to an engageable state. In the engageable state, the wire gripping portion is open.

DETAILED DESCRIPTION

Hereinafter, embodiment of the present invention will be described with reference to drawings. Various features described in the embodiment below can be combined with each other.

1. First Embodiment

Figure 1:
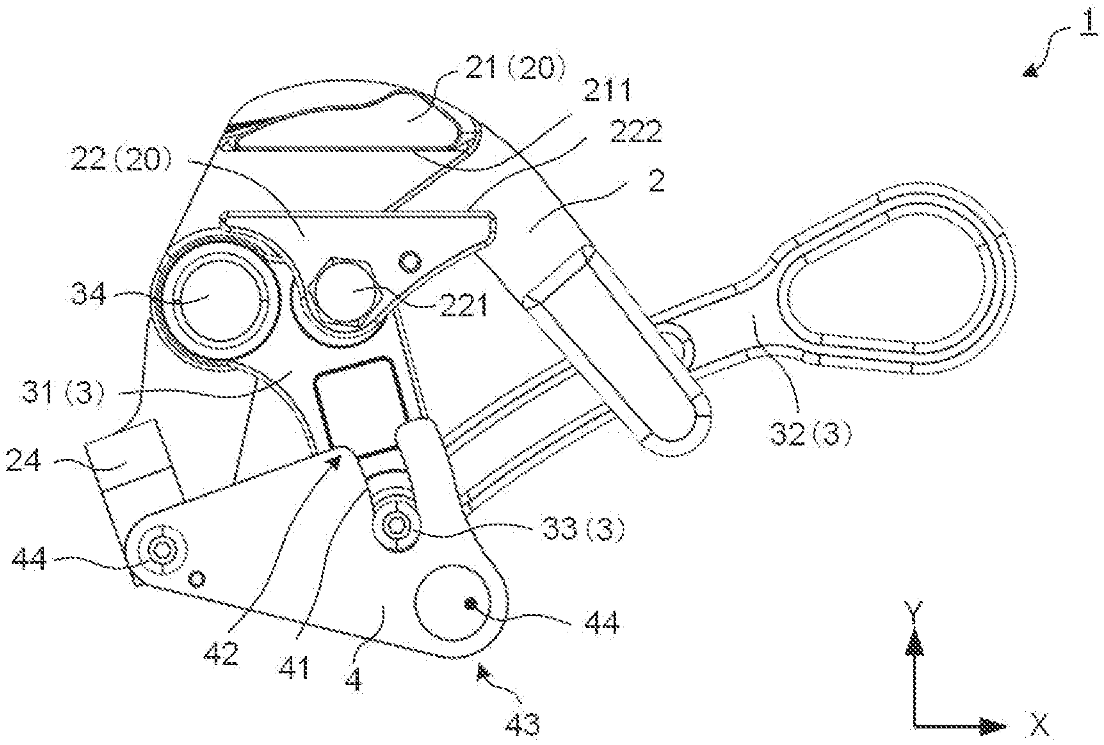
FIG. 1 is a front view of a wire gripper 1 according to a first embodiment.
Figure 2:
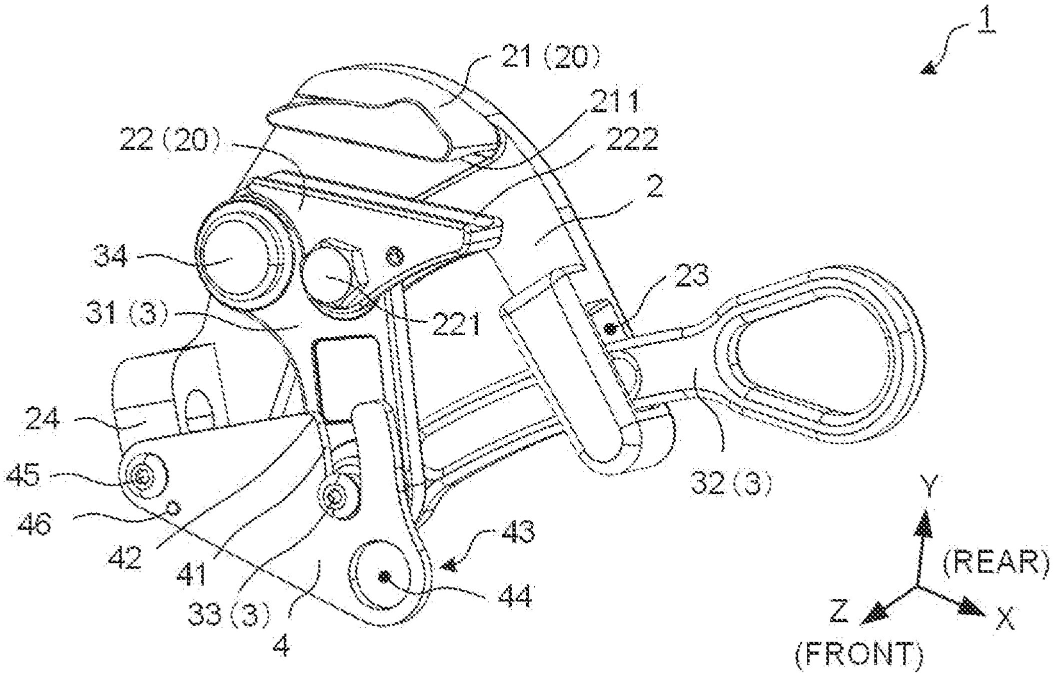
FIG. 2 is a perspective view of the wire gripper 1 according to the first embodiment.
Figure 3:
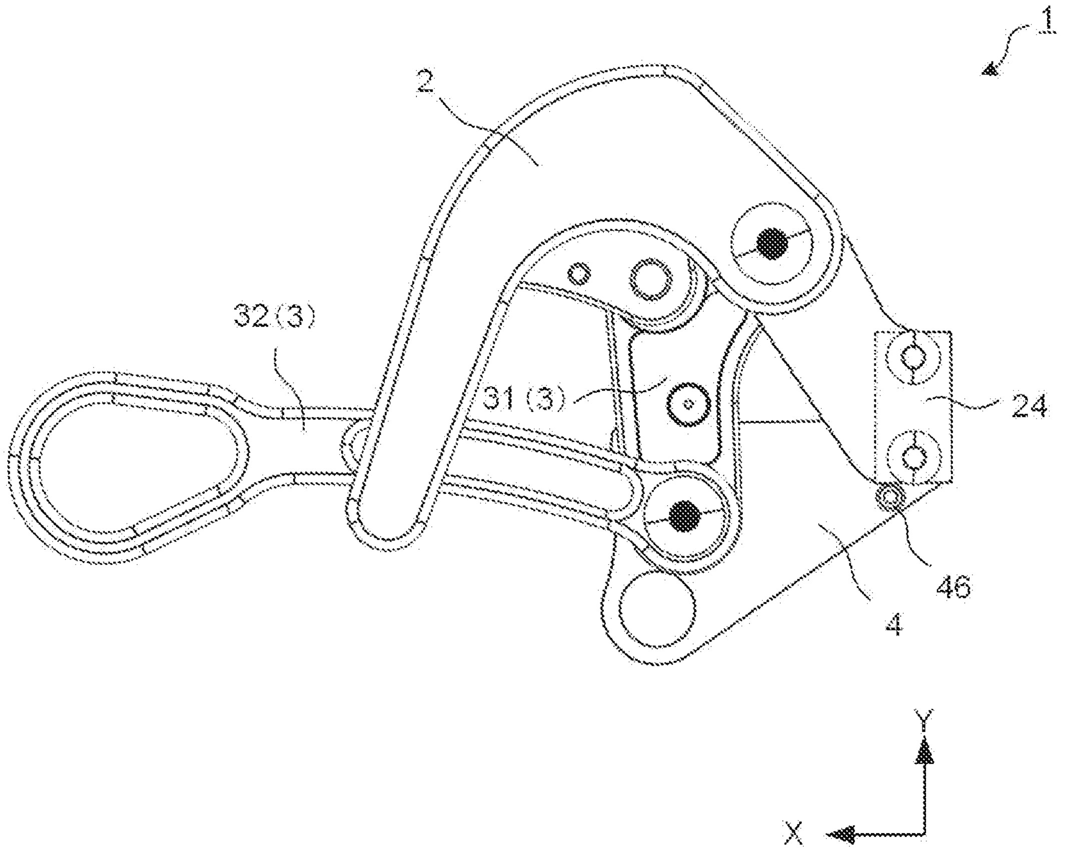
FIG. 3 is a rear view of the wire gripper 1 according to the first embodiment.

In a first section, a wire gripper 1 according to a first embodiment will be described. FIG. 1 is a front view of the wire gripper 1 according to the first embodiment. FIG. 2 is a perspective view of the wire gripper 1 according to the first embodiment. FIG. 3 is a rear view of the wire gripper 1 according to the first embodiment.

1.1. Overall Configuration

The wire gripper 1 comprises a main body 2, a wire gripping portion 20, a first actuating portion 3, and a second actuating portion 4. Hereinafter, these specific components will be described in detail.

<Main Body 2>

FIGS. 1, 2 and 3 show the wire gripper 1 in a state in which the first actuating portion 3 and the second actuating portion 4 are engaged. As shown in FIGS. 1 and 2, the main body 2 has a base portion 24, a spindle portion 34 and a first wire gripping portion 21. The base portion 24 has a hole for allowing a bolt 45 to insert, and allows the second actuating portion 4 to be fixed in a rotatable manner by the bolt 45. The spindle portion 34 has a through hole and a bolt. Such a bolt passes through the through hole and can be used as an axis, thereby rotatably fixing the support portion 31. Furthermore, the main body 2 has a through hole 23. A pushing portion 32 passes through the through hole 23 and is provided with a pushing portion 32 that can move inside the through hole 23. The first wire gripping portion 21 is integrally disposed with the main body 2.

<Wire Gripping Portion 20>

The wire gripping portion 20 has a first wire gripping portion 21 and a second wire gripping portion 22 disposed opposite to the first wire gripping portion 21. The wire gripping portion 20 has the first wire gripping portion 21 located above and the second wire gripping portion 22 located below. The second wire gripping portion 22 is provided on the support portion 31 and is fixed in a rotatable manner by a bolt 221. The second wire gripping portion 22 moves up and down in conjunction with operation of the support portion 31, enabling the wire gripping portion 20 to open and close.

In particular, the wire gripping portion 20 can grip a linear object by closing the first wire gripping portion 21 and the second wire gripping portion 22. Specifically, by allowing the second wire gripping portion 22 to operate in a direction of the first wire gripping portion 21 disposed above the main body 2, a space between the first wire gripping portion 21 and the second wire gripping portion 22 is closed, a linear object (not shown) inserted between the first wire gripping portion 21 and the second wire gripping portion 22 can be gripped.

Further, as shown in FIG. 2, it is preferable that a linear object gripping surface 211 of the first wire gripping portion 21 and a linear object gripping surface 222 of the second wire gripping portion 22 are provided with U-shaped recess, and such recess more preferably has indentation. This allows the wire gripping portion 20 to be firmly fixed to the linear object without slipping.

<First Actuating Portion 3>

The first actuating portion 3 has a pushing portion 32 and a support portion 31. A bolt, which also serves as an engaging portion 33, is disposed at a connection part between the pushing portion 32 and the support portion 31, and fixes the support portion 31 and the pushing portion 32 in a rotatable manner respectively.

The support portion 31 is fixed to the main body 2 by the spindle portion 34, and is rotatable using the spindle portion 34 as a spindle. Further, the second wire gripping portion 22 is rotatably fixed to an upper part of the support portion 31 by a bolt 221. In particular, the spindle portion 34 is provided with a spring (not shown), and the support portion 31 is attached by such spring to rotate counterclockwise.

The pushing portion 32 can be moved in a longitudinal direction by operation of an operator, the support portion 31 rotates in conjunction with movement of the pushing portion 32, and the second wire gripping portion 22 moves in conjunction with movement of the support portion 31. Specifically, a series of movements are performed with the pushing portion 32 as a force point, the support portion 31 as a fulcrum, and the second wire gripping portion 22 as an action point. In particular, the second wire gripping portion 22, which is the action point, is capable of gripping the linear object with a force equal to or greater than a force with which the pushing portion 32 is pulled.

<Second Actuating Portion 4>

The second actuating portion 4 is rotatably fixed to the base portion 24 by the bolt 45. The second actuating portion 4 has a recess shaped engaged portion 41. With such a configuration, the engaging portion 33 engages with the engaged portion 41, and the second actuating portion 4 can fix the first actuating portion 3. This makes it possible to fix the wire gripping portion 20 in an open state. A recess edge portion 42, which is an entrance part of the engaging portion 33 in the engaged portion 41, preferably has a rounded corner. As a result, the engaging portion 33 can be smoothly engaged without being caught at an entrance part of the engaged portion 41.

The second actuating portion 4 preferably has an annular portion 43. The annular portion 43 has a through portion 44, which can be hooked and rotated by a finger of the operator or a stick. The annular portion 43 is preferably located below the wire gripper 1. This enables an operator working upward to easily operate the second actuating portion 4.

Further, a screw 46 is provided near the bolt 45. As shown in FIG. 3, the screw 46 contacts with a side of the base portion 24 when the second actuating portion 4 is rotated clockwise as viewed from front of the wire gripper 1. With such a configuration, when the pushing portion 32 is pushed, the engaging portion 33 of the second actuating portion 4 can be engaged with the engaged portion 41.

2. Second Embodiment

Figure 4:
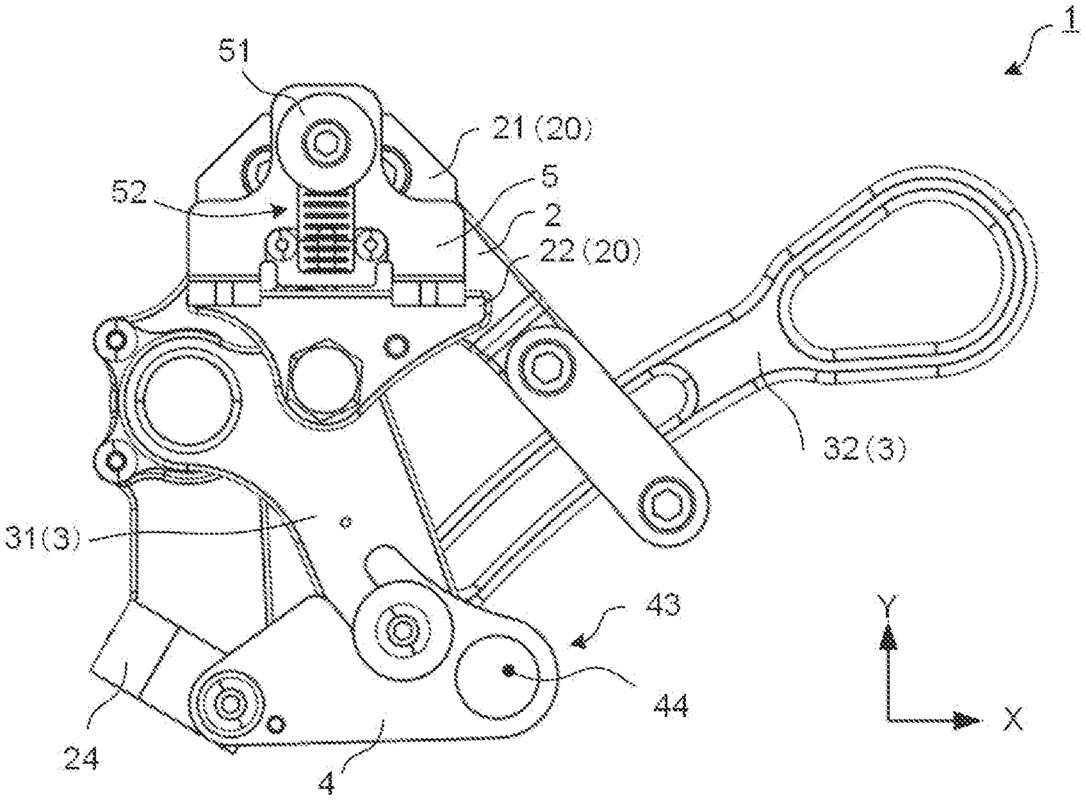
FIG. 4 is a front view of a wire gripper 1 according to a second embodiment.
Figure 5:
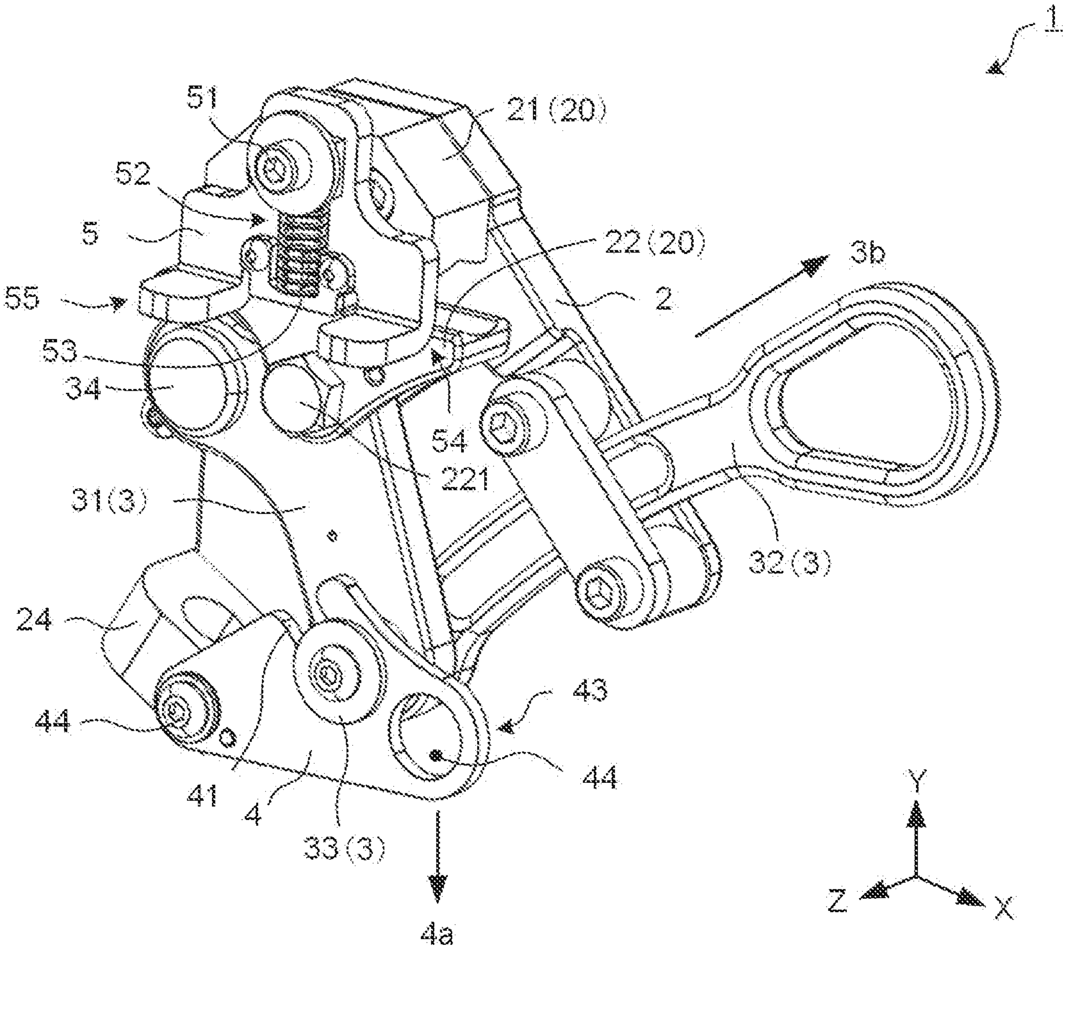
FIG. 5 is a perspective view of the wire gripper 1 according to the second embodiment.
Figure 6:
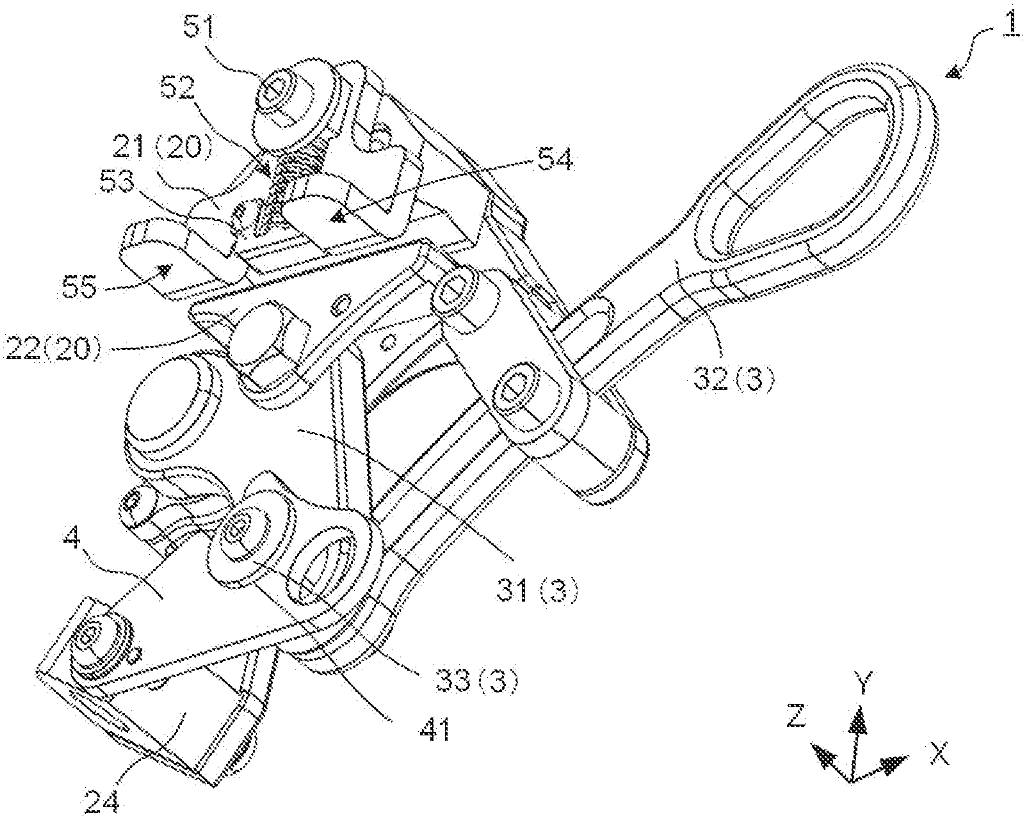
FIG. 6 is a perspective view of the wire gripper 1 according to the second embodiment.
Figure 7:
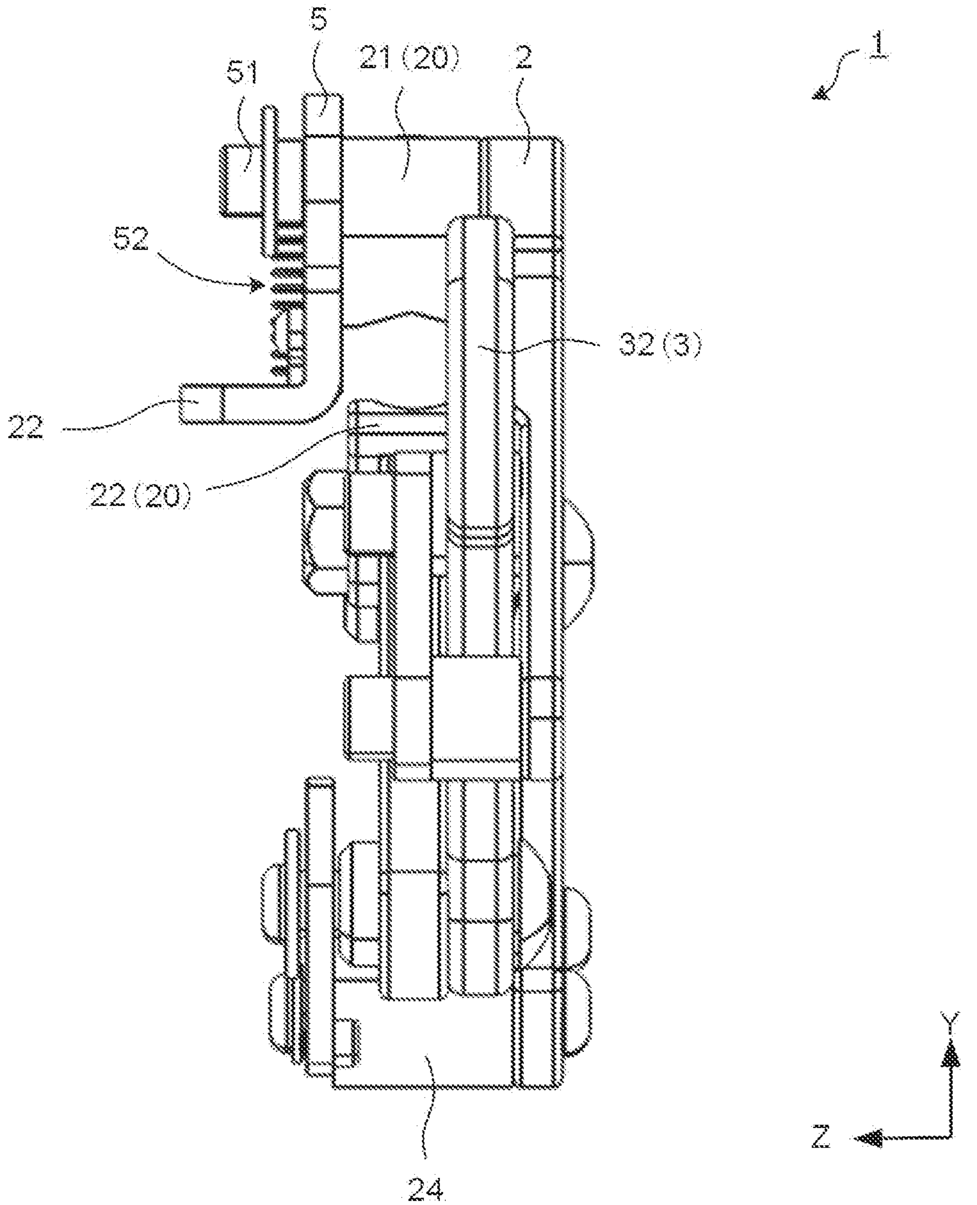
FIG. 7 is a side view of the wire gripper 1 according to the second embodiment.

Subsequently, a wire gripper 1 according to a second embodiment will be described in a second section. However, description of common parts with the wire gripper 1 according to the first embodiment will be omitted. FIG. 4 is a front view of the wire gripper 1 according to the second embodiment. FIG. 5 is a perspective view of the wire gripper 1 according to the second embodiment. FIG. 6 is a perspective view of the wire gripper 1 according to the second embodiment. FIG. 7 is a side view of the wire gripper 1 according to the second embodiment. Same symbols will be used to describe the parts in common with the wire gripper 1 according to the first embodiment.

FIGS. 4, 5 and 6 show the wire gripper 1 in a state where a first actuating portion 3 and a second actuating portion 4 are engaged. As shown in FIGS. 4 and 5, regarding the wire gripper 1 according to the second embodiment, a first wire gripping portion 21 has a third actuating portion 5. The third actuating portion 5 is fixed to the first wire gripping portion 21 by a bolt 51 so as to be vertically slidable. Further, the third actuating portion 5 is positioned so as to cover a space between the first wire gripping portion 21 and a second wire gripping portion 22, which is an insertion opening of a linear object.

When the linear object passes between the third actuating portion 5 and the second wire gripping portion 22, the third actuating portion 5 can move in a direction away from the second wire gripping portion 22. A spring 52 in a compressed state is provided between the bolt 51 and a spring fixing portion 53. The spring 52 is, for instance, a compressed coil spring. Specifically, when an operator inserts a linear object between an end 54 and an end 55 of the third actuating portion 5 and an upper part of the second wire gripping portion 22 (hereinafter referred to as "linear object insertion entrance"), the spring 52 compresses as it is pushed from below, and the third actuating portion 5 moves toward the first wire gripping portion 21. As a result, even when the wire gripping portion 20 is open, the linear body inserted into the wire gripping portion 20 can be prevented from coming off due to vibration or the like.

As shown in FIGS. 6 and 7, it is preferable that the end 54 and the end 55 of the third actuating portion 5 are bent over in an L-shape and a corner of a bent portion is rounded. This allows the linear object to smoothly pass through a space between the third actuating portion 5 and the second wire gripping portion 22.

3. Engagement Mechanism

Figure 8:
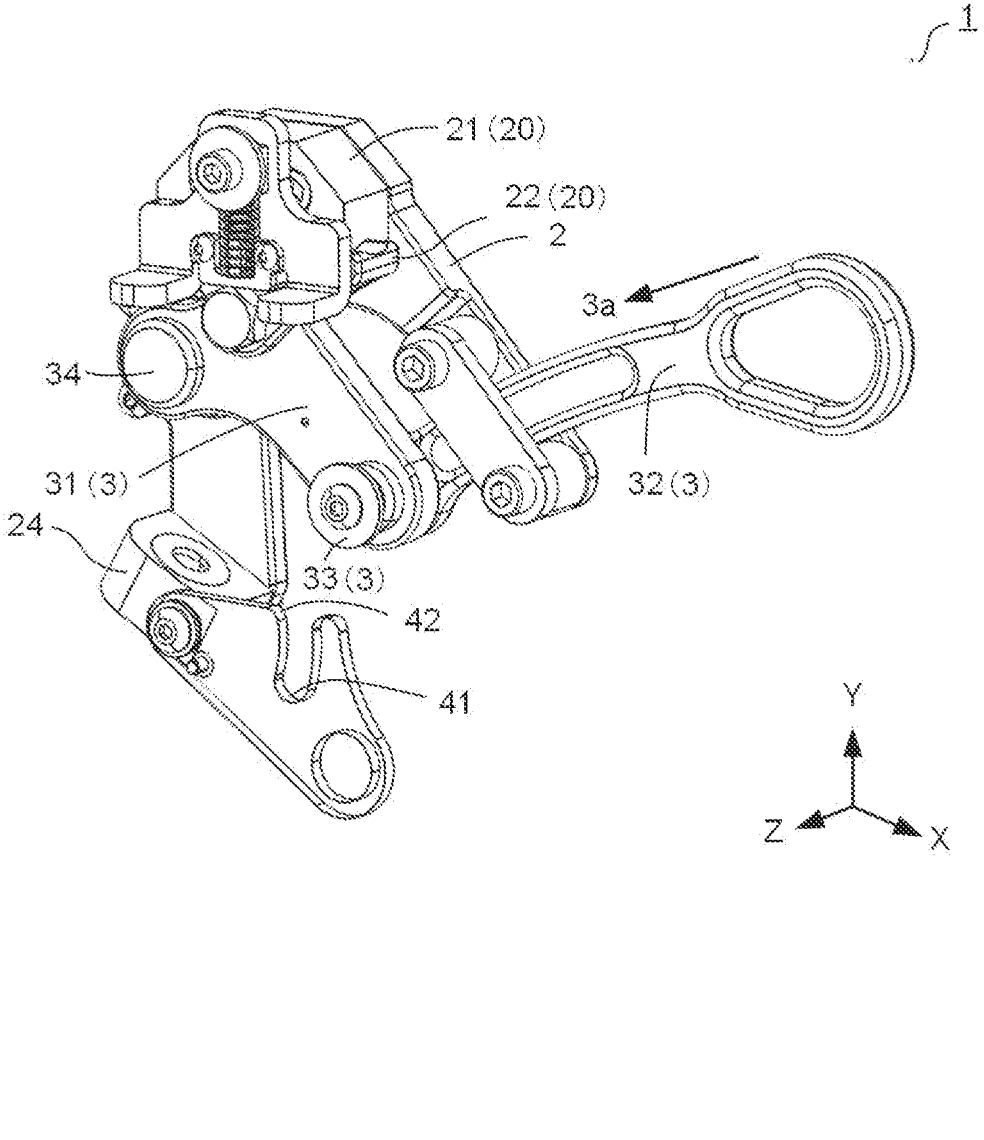
FIG. 8 shows a wire gripper 1 in a state in which a first actuating portion 3 and a second actuating portion 4 are not engaged.

Next, an engagement mechanism of a wire gripper 1 will be described by taking the wire gripper 1 according to the second embodiment as an example. FIG. 8 shows the wire gripper 1 in a state where a first actuating portion 3 and a second actuating portion 4 are not engaged.

As shown in the drawing, when the first actuating portion 3 and the second actuating portion 4 are not engaged, the wire gripper 1 remains in a state where a wire gripping portion 20 is closed. Here, when the first actuating portion 3 is pushed in a direction of arrow 3*a*, the first actuating portion 3 and the second actuating portion 4 transition to an engageable state. Specifically, when a pushing portion 32 is pushed in a longitudinal direction of a pushing portion 32, an engaging portion 33 and an engaged portion 41 transition to an engageable state. Here, the wire gripping portion 20 is open in the engageable state.

Figure 9:
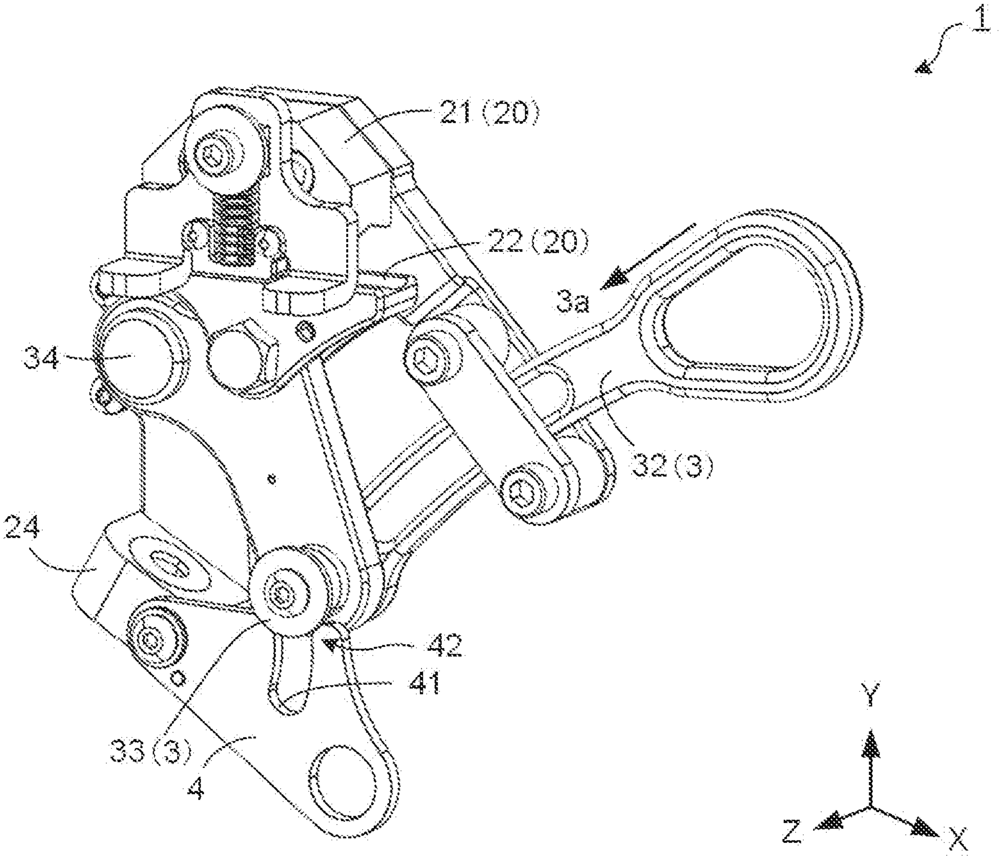
FIG. 9 shows the wire gripper 1 in a state in which the first actuating portion 3 and the second actuating portion 4 can be engaged.

Specifically, when the pushing portion 32 provided in the first actuating portion 3 is pushed in the direction of arrow 3*a*, the engaging portion 33 moves to a direction of the engaged portion 41 of the second actuating portion 4 and contacts a recess edge portion 42, and the engaging portion 33 and the engaged portion 41 are transition to the engageable state. FIG. 9 shows the wire gripper 1 in a state where the first actuating portion 3 and the second actuating portion 4 can be engaged.

Further, when the pushing portion 32 is pushed in the direction of arrow 3*a*, a support portion 31 rotates clockwise with a spindle portion 34 as a spindle, and the second wire gripping portion 22 attached to an upper part of the support portion 31 moves in a direction away from the first wire gripping portion 21. As the second wire gripping portion 22 moves downward, the closed wire gripping portion 20 opens.

When the first actuating portion 3 is further pushed in the engageable state, the engaging portion 33 and the engaged portion 41 transition to an engaged state. The state in which the engaging portion 33 and the engaged portion 41 are engaged is shown in FIG. 5. Accordingly, by pushing the first actuating portion 3, the second actuating portion 4 is engaged with the first actuating portion 3 and fixed while keeping the wire gripping portion 20 open. In other words, by simply pushing the first actuating portion 3 once, the wire gripper 1 can be fixed in a state where the wire gripping portion 20 keeps in an open state. As a result, since the open state of the wire gripping portion 20 is maintained without continuously pushing the pushing portion 32, it is possible to more easily attach a linear object when attaching the linear object to the wire gripper 1.

When the engagement between the first actuating portion 3 and the second actuating portion 4 is released, the support portion 31 rotates counterclockwise with the spindle portion 34 as a spindle, as well as the pushing portion 32 moves in a direction of arrow 3*b*, and the wire gripping portion 20 moves in a closing direction. Here, it is preferable to pull the annular portion 43 of the second actuating portion 4 in a direction of arrow 4*a* with a finger or a stick when releasing such engagement. Such operation makes it easier for an operator located below, who is working upward, to release the engagement and grasp the linear object more easily.

In summary, the closed wire gripping portion 20 opens when the operator pushes the pushing portion 32, and when the operator pushes further, the wire gripper 1 is retained with the wire gripping portion 20 in the open state. Thus, regarding the wire gripper 1 according to the first and second embodiments, the wire gripper 1 is retained with the wire gripping portion 20 in the open state with simply one push of the pushing portion 32 by the operator. As a result, the operator can easily insert a linear object into the wire gripping portion 20.

After inserting the linear object into the wire gripping portion 20, the engagement between the engaging portion 33 and the engaged portion 41 is released by simply hook the annular portion 43 with a finger or a stick and pull downward. In addition, the wire gripping portion 20 closes in conjunction with engagement release, enables the linear object to be fixed while being firmly gripped. As a result, the operator can easily perform a work of gripping the linear object using the wire gripper 1.

4. Variation

Each of the above-described embodiments may be implemented by the following manner. Hereinafter, same symbols will be used to describe the parts in common with the wire gripper 1 according to the first and second embodiments.

4.1 First Variation

Figure 10:
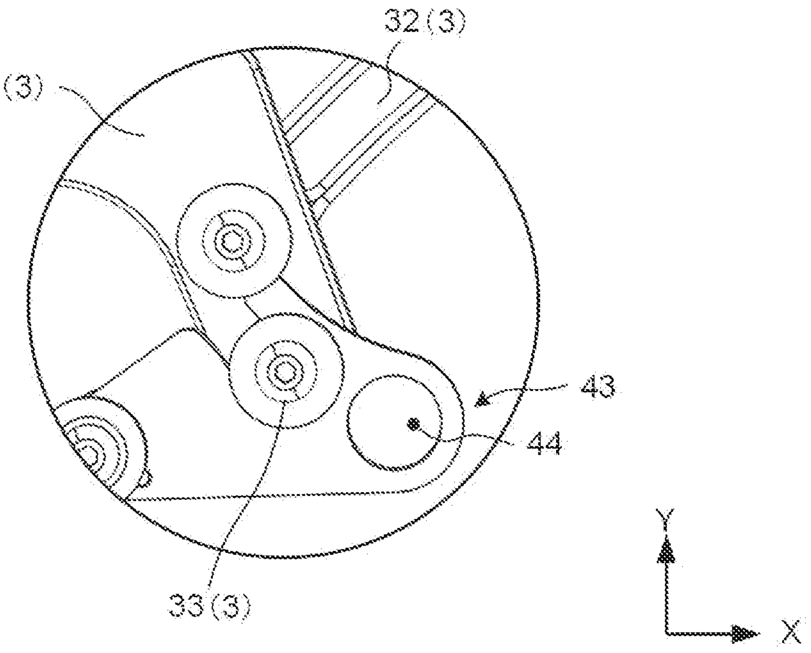
FIG. 10 shows a variation of a support portion 31.

FIG. 10 shows a variation of the support portion 31. In the embodiment described above, the connecting part between the support portion 31 and the pushing portion 32 also served as the engaging portion 33, but as shown in FIG. 10, the engaging portion 33 and the connecting part may be provided separately.

4.2 Second Variation

Figure 11:
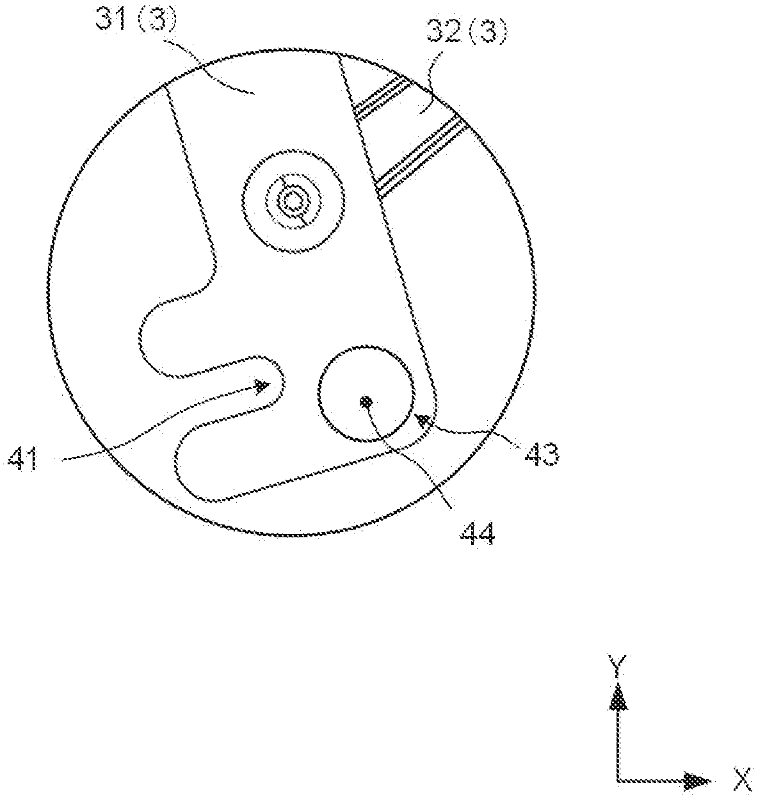
FIG. 11 shows a variation of the support portion 31.
Figure 12:
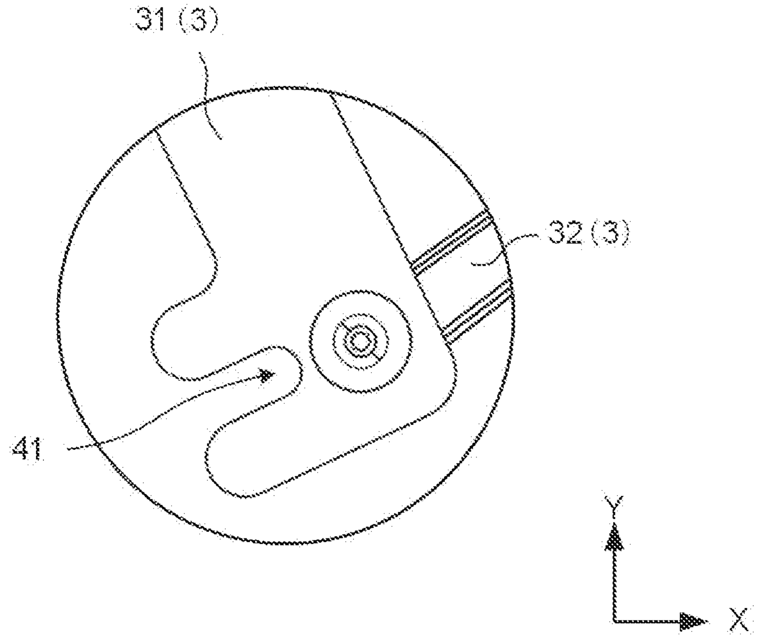
FIG. 12 shows a variation of the support portion 31.

FIGS. 11 and 12 show variations of the support portion 31. In the embodiment described above, although an example is shown in which the first actuating portion 3 is provided with the engaging portion 33 and the second actuating portion 4 is provided with the engaged portion 41, the first actuating portion 3 may be provided with the engaged portion 41 as shown in FIGS. 11 and 12. In particular, as shown in FIG. 12, the engaged portion 41 may be disposed at a connecting part between the pushing portion 32 and the support portion 31. That is, it is sufficient that the engaging portion 33 or the engaged portion 41 is disposed at the connecting part between the pushing portion 32 and the support portion 31. Further, the second actuating portion 4 may be provided with the engaging portion 33. In other words, one of the first actuating portion 3 and the second actuating portion 4 may have the engaging portion 33 and the other may have the engaged portion 41. As shown in FIG. 11, the support portion 31 may have an annular portion 43.

4.3 Third Variation

Figure 13:
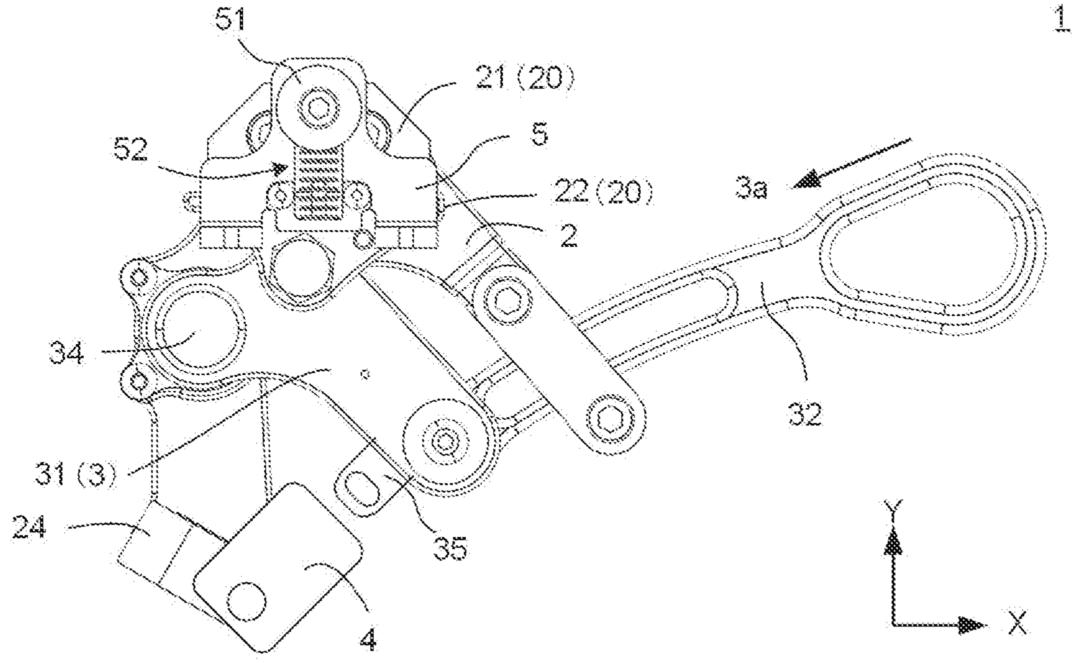
FIG. 13 shows a variation of the first actuating portion 3 and the second actuating portion 4.

FIG. 13 shows a variation of the first actuating portion 3 and the second actuating portion 4. In the previous embodiment, the recess shaped engaged portion 41 and the engaging portion 33 engage together to fix the first actuating portion 3 and the second actuating portion 4. However, as shown in FIG. 13, the support portion 31 may be provided with a tang 35 and the second actuating portion 4 may function as a buckle with an insertion opening. In such a case, when the pushing portion 32 is pushed in a longitudinal direction (in the direction of arrow 3*a*), the tang 35 may be inserted into the insertion opening of the buckle and the first actuating portion 3 and the second actuating portion 4 may be fixed. In particular, the second actuating portion 4 is preferably provided with a buckle release button (not shown), and the buckle is released when the operator presses the buckle release button. Such a configuration enables the operator to grasp the linear object with a simple operation.

4.4 Fourth Variation

Figure 14:
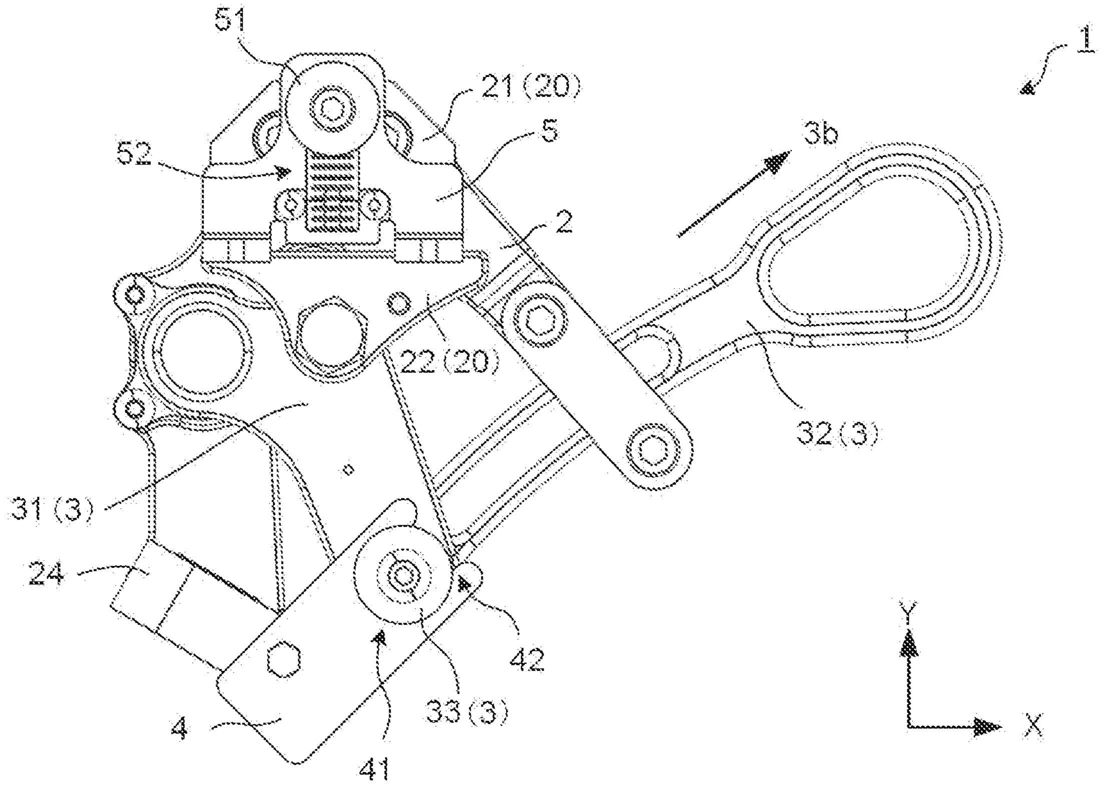
FIG. 14 shows a variation of the second actuating portion 4.

FIG. 14 shows a variation of the second actuating portion 4. As shown in the drawing, a recess part of the engaged portion 41 may be fixed so as to face in a direction of the pushing portion 32. In such a case, the engagement can be released simply by pushing the pushing portion 32 and pulling the engaging portion 33 and the engaged portion 41 in a direction (in the direction of arrow 3*b*) opposite to when they were engaged. Note that the second actuating portion 4 does not have to include the annular portion 43.

4.5 Fifth Variation

Figure 15:
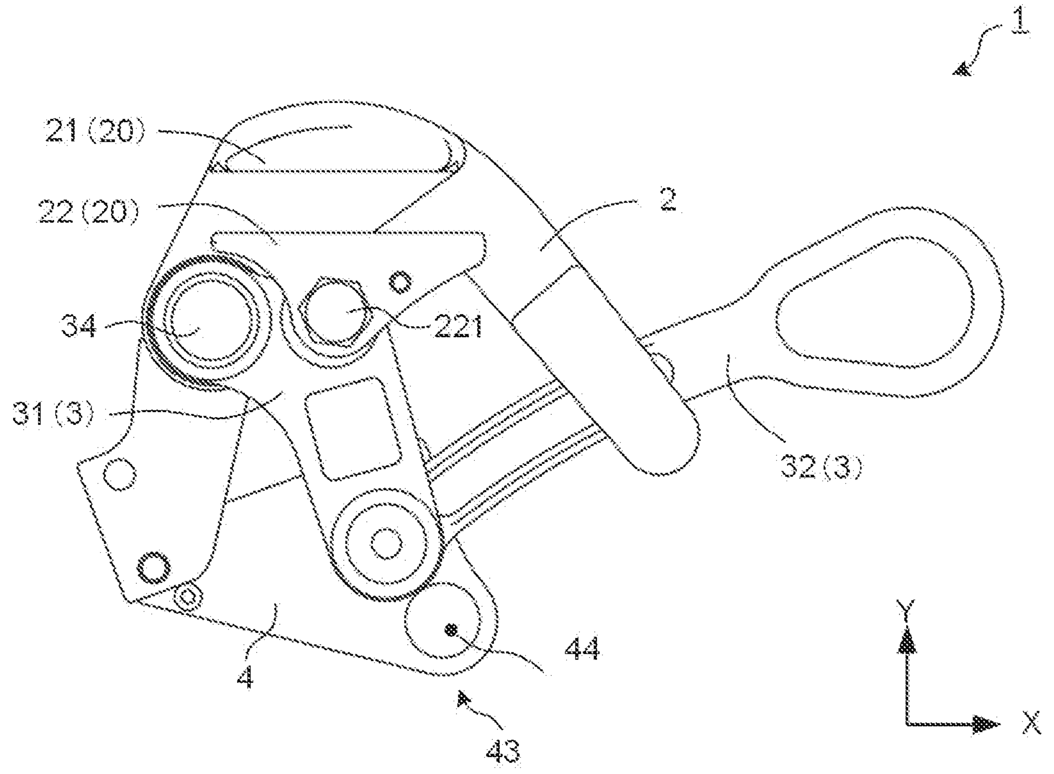
FIG. 15 is a front view of a variation of the wire gripper 1.
Figure 16:
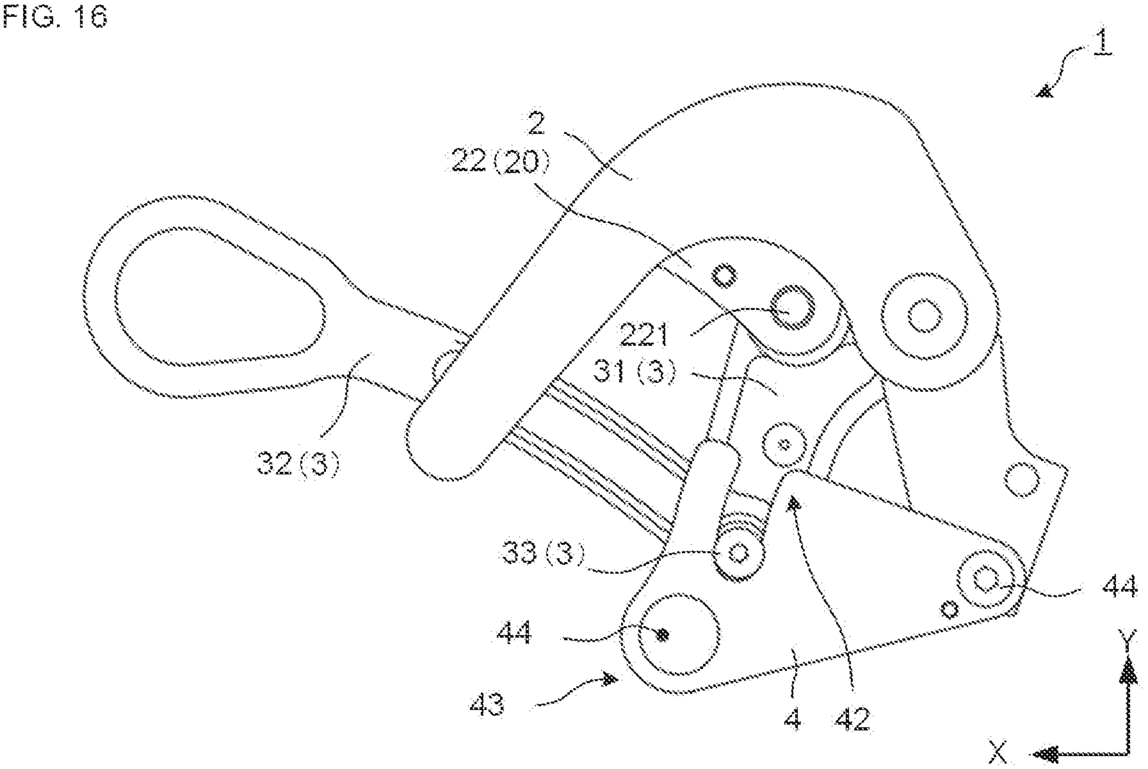
FIG. 16 is a rear view of a variation of the wire gripper 1.

FIG. 15 is a front view of a variation of the wire gripper 1. FIG. 16 is a rear view of a variation of the wire gripper 1. Regarding the wire gripper 1 according to the first and second embodiments, it is shown that the second actuating portion 4 is disposed on a front side of the wire gripper 1, and the first actuating portion 3 and the second actuating portion 4 are engaged on the front side of the wire gripper 1, but the first actuating portion 3 and the second actuating portion 4 may be engaged on a rear side of the wire gripper 1 as shown in FIGS. 15 and 16. Further, the second actuating portion 4 may be fixed to a rear side of the main body 2 in a rotatable manner without being fixed to the base portion 24.

4.6 Sixth Variation

Figure 17:
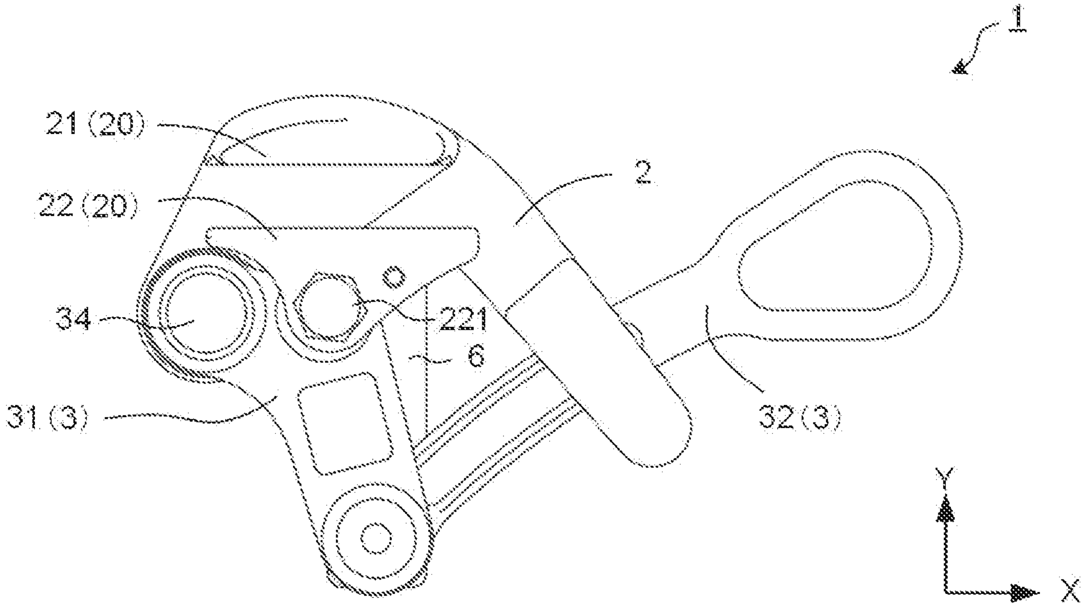
FIG. 17 is a front view of a variation of the wire gripper 1.
Figure 18:
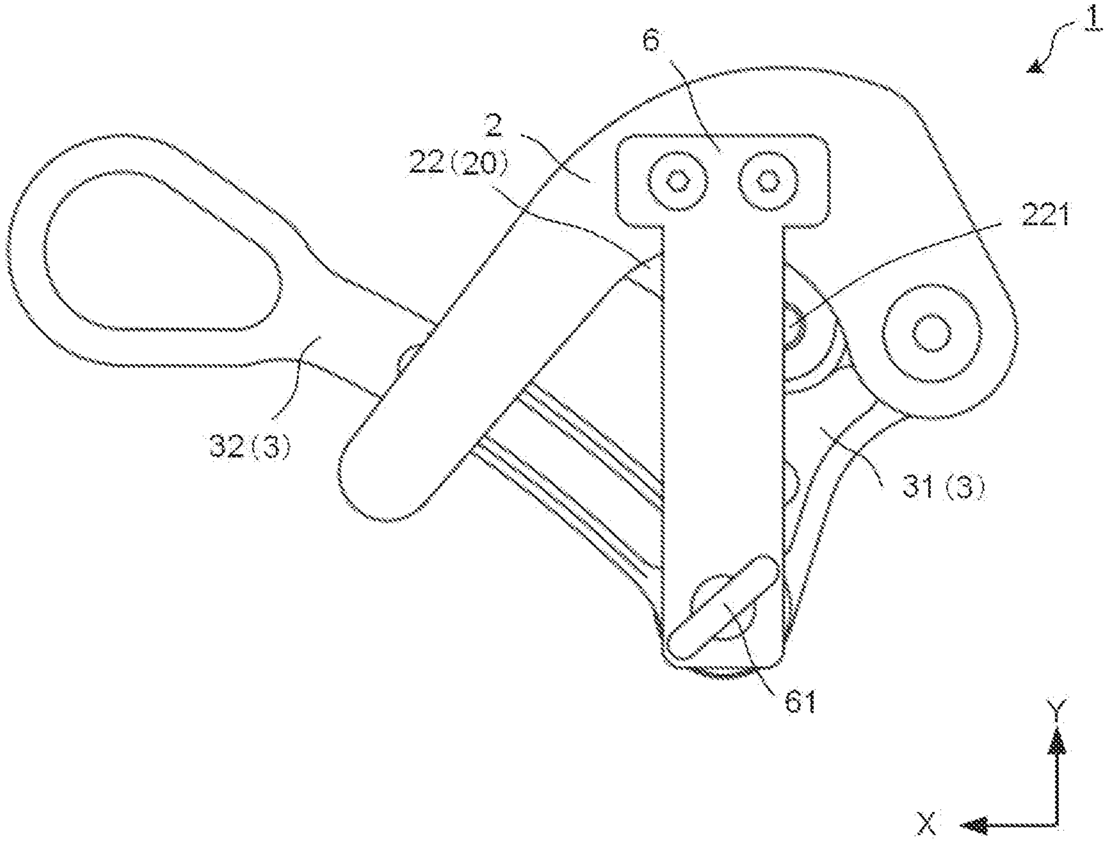
FIG. 18 is a rear view of a variation of the wire gripper 1.

FIG. 17 is a front view of a variation of the wire gripper 1. FIG. 18 is a rear view of a variation of the wire gripper 1. As shown in FIGS. 17 and 18, a fourth actuating portion 6 may be provided instead of the second actuating portion 4. The fourth actuating portion 6 is fixed to the main body 2 by a bolt and has a through hole as well as a locking portion 61 fixed to the through hole in a rotatable manner. The locking portion 61 can fix the support portion 31 or the pushing portion 32 when the pushing portion 32 is rotated in a pushed state. Specifically, the locking portion 61 has an engaging portion or an engaged portion (not shown), and when the locking portion 61 is rotated while the pushing portion 32 is being pushed, the locking portion 61 can fix the support portion 31 or the pushing portion 32 by engaging with the engaging portion or the engaged portion not shown in the drawing arranged at the connecting part of the support portion 31 and the pushing portion 32. The engaging portion or the engaged portion that engages with the locking portion 61 may be provided in the support portion 31 or the pushing portion 32 instead of in the connecting part.

4.7 Other Embodiments (1) In the above-described embodiments, although an example in which the second wire gripping portion 22 is movable is illustrated, the first wire gripping portion 21 may be movable, or both the second wire gripping portion 22 and the first wire gripping portion 21 may be movable in a direction of the opposing wire gripping portion 20 to grip a linear object.

(2) In the above-described embodiments, an example in which the engaging portion 33 and the engaged portion 41 are engaged when the pushing portion 32 is pushed in the direction of arrow 3*a* is illustrated. However, the engaged portion 41 may be engaged with the engaging portion 33 by moving the second actuating portion 4 by an operator in a state where the pushing portion 32 is pushed and the wire gripping portion 20 is open.

Furthermore, the present invention may be provided in each of the following aspects.

The wire gripper, wherein: among the first and second actuating portions, one has an engaging portion and other one has an engaged portion, and when the first actuating portion is pushed, the engaging portion and the engaged portion transition to an engageable state.

The wire gripper, wherein: when the first actuating portion is pushed, the first and second actuating portions transition to the engageable state, and when the first actuating portion is further pushed in the engageable state, the engaging portion and the engaged portion transition to an engaged state.

The wire gripper, wherein: the first actuating portion has a pushing portion and a support portion, and the engaging portion or the engaged portion is disposed at a connecting part between the pushing portion and the support portion.

The wire gripper, wherein: when the pushing portion is pushed, the engaging portion and the engaged portion transition to the engageable state.

The wire gripper, wherein: The engaged portion is formed in a recess shape.

The wire gripper, wherein: the wire gripping portion has a first wire gripping portion and a second wire gripping portion disposed opposite to the first wire gripping portion, the first wire gripping portion and the second wire gripping portion grip the linear object by being closed, the first wire gripping portion has a third actuating portion, and the third actuating portion moves in a direction away from the second wire gripping portion when the linear object passes between the third actuating portion and the second wire gripping portion.

The wire gripper, wherein: when engagement is released, the wire gripping portion moves in a closing direction.

The wire gripper, wherein: the second actuating portion has an annular portion.

Of course, the present invention is not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

REFERENCE SIGNS LIST

1: Wire gripper
2: Main body
20: Wire gripping portion
21: First wire gripping portion
211: Linear object gripping surface
22: Second wire gripping portion
221: Bolt
222: Linear object gripping surface
23: Through portion
24: Base portion
3: First Actuating portion
3*a*: Arrow
3*b*: Arrow
31: Support portion
32: Pushing portion
33: Engaging portion
34: Spindle portion
35: Tang
4: Second actuating portion

4*a*: Arrow
41: Engaged portion
42: Recess edge portion
43: Annular portion
44: Through portion
45: Bolt
46: Screw
5: Third Actuating portion
51: Bolt
52: Spring
53: Spring fixing portion
54: End
55: End
6: Fourth actuating portion
61: Locking portion

What is claimed is:

1. A wire gripper, comprising:
a main body including a base portion;
a wire gripping portion including a first wire gripping portion fixed to the main body and a second wire gripping portion disposed opposite to the first wire gripping portion, the first wire gripping portion and the second wire gripping portion being configured to grip a linear object by being closed;
a first actuating portion comprising a support that is rotatably supported by the main body at a position of the main body between the first wire gripping portion and the base portion and a pushing portion configured to be pushed toward the base portion; and
a second actuating portion that is rotatably supported by the base portion,
wherein:
one of the first actuating portion and the second actuating portion has an engaging bolt and the other one of the first actuating portion and the second actuating portion has a recess,
when the pushing portion is pushed toward the base portion, the first actuator and the second actuator are configured to transition to an engageable state with each other in which the engaging bolt is positioned at an entrance of the recess and in which
the wire gripping portion is open, and
when the pushing portion is further pushed toward the base portion, the engaging bolt enters the recess.

2. The wire gripper according to claim 1, wherein:
the first actuating portions has the engaging bolt, and
the second actuating portion has the recess.

3. The wire gripper according to claim 1, wherein:
the first actuating portion has the recess, and
the second actuating portion has the engaging bolt.

4. The wire gripper according to claim 1, wherein:
the first actuating portion has a pushing portion and a support portion, and
the engaging bolt or the engaged recess is disposed at a position at which the pushing portion is connected to the support.

5. The wire gripper according to claim 1, wherein:
the recess is formed in a curved shape.

6. The wire gripper according to claim 1, wherein:
the first wire gripping portion has a third actuating portion, and
the third actuating portion moves in a direction away from the second wire gripping portion when the linear object passes between the third actuating portion and the second wire gripping portion.

7. The wire gripper according to claim 1, wherein:
when second actuating portion is rotated such that the engaging bolt exits the recess, the wire gripping portion moves in a closing direction.

8. The wire gripper according to claim 1, wherein:
the second actuating portion has an annular portion.

9. The wire gripper according to claim 1, wherein:
the support is rotatably fixed to the main body by a spindle.

10. The wire gripper according to claim 1, wherein:
the main body has a through hole, and the pushing portion passes through the through hole and is movable inside the through hole.

11. The wire gripper according to claim 1, wherein:
a linear object gripping surface of the first wire gripping portion and a linear object gripping surface of the second wire gripping portion are each provided with a U-shaped recess.

12. The wire gripper according to claim 1, wherein:
the recess has an edge portion that is rounded at the entrance of the recess.

13. The wire gripper according to claim 1, wherein:
when the pushing portion is pushed toward the base portion, the support rotates and the second wire gripping portion moves in conjunction with a movement of the support with the pushing portion serving as a force point, the support serving as a fulcrum, and the second wire gripping portion serving as an action point.

14. The wire gripper according to claim 1, wherein:
the second actuating portion has a through portion configured to be hooked by a finger of an operator or a stick.

15. The wire gripper according to claim 1, wherein the second actuating portion comprises a screw, and
wherein, when the pushing portion is further pushed toward the base portion, the base portion pushes against the screw to rotate the second actuator such that the engaging bolt enters the recess.

* * * * *